Sept. 21, 1965  R. W. OBARSKI  3,206,973
APPARATUS FOR TESTING TIRES AND THE LIKE
Filed Sept. 24, 1962  3 Sheets-Sheet 1

INVENTOR.
RICHARD W. OBARSKI
BY
ATTYS.

Sept. 21, 1965 R. W. OBARSKI 3,206,973
APPARATUS FOR TESTING TIRES AND THE LIKE
Filed Sept. 24, 1962 3 Sheets-Sheet 2

INVENTOR.
RICHARD W. OBARSKI
BY
ATTYS.

Sept. 21, 1965  R. W. OBARSKI  3,206,973
APPARATUS FOR TESTING TIRES AND THE LIKE
Filed Sept. 24, 1962  3 Sheets-Sheet 3

INVENTOR.
RICHARD W. OBARSKI
BY
ATTYS.

United States Patent Office 3,206,973
Patented Sept. 21, 1965

3,206,973
APPARATUS FOR TESTING TIRES
AND THE LIKE
Richard W. Obarski, Stow, Ohio, assignor to Adamson
United Company, Summit, Ohio, a corporation of Ohio
Filed Sept. 24, 1962, Ser. No. 225,576
7 Claims. (Cl. 73—146)

This invention relates to apparatus for testing tires and other rotary members, and, more particularly, it is concerned with simplified apparatus of this type.

Various types of testing apparatus of the character described have been provided heretofore, but known machines are open to the objection that elaborate and cumbersome linkages have often been utilized to measure loading forces, and these usually involve frictional inaccuracies of an amount so that small, but perhaps significant improvement in the rotary member being tested cannot be recognized or determined. Moreover, known machines have tended to become so large and complicated that they are very expensive.

It is the general object of the present invention to avoid and overcome the foregoing and other difficulties of and objections to prior known equipment by the provision of apparatus characterized by simplicity and inexpensiveness of construction, but possessing extremely accurate and sensitive load measuring arrangements whereby improvements of small but significant amounts in the rotary member being tested can be recognized and measured.

Another object of the invention is the provision of pneumatic tire-testing apparatus requiring a minimum of floor space, and pit dimensions, but adapted to handle tires of a wide variety of sizes.

Another object of the invention is the provision of testing apparatus for rotary members wherein errors arising from gravity forces, from inertia forces in the load measuring system, and from trying to perform too many different operations upon a single apparatus are eliminated or materially reduced.

Other objects of the invention are to provide apparatus of the type described wherein force measuring cells are positioned ahead of points of friction, wherein the cells can be preloaded, wherein the cells can be cut out of operation without removing them, and wherein floating aligning means are provided to allow for dimensional changes.

The foregoing objects of the invention, and other objects which will become apparent as the description proceeds, are achieved by the provision of apparatus for testing tires and the like and including a flywheel, means for rotating the flywheel, a bed extending in the plane of the flywheel, a carriage slidably mounted on the bed, means for adjustably moving the carriage toward and from the flywheel, a Y-shaped arm, means pivotally mounting the arm in vertically extending position on the carriage on an axis parallel to the axis of the flywheel, means pivotally mounted on the carriage and pivotally connected to the arm for effecting swinging movement of the top of the arm toward and from the flywheel, a link pivotally mounted on the upper end of each branch of the Y-shaped arm, each link being pivoted on an axis parallel to the axis of the flywheel, an axle carried by the upper ends of the links parallel to the axis of the flywheel, a rotary member to be tested rotatably carried by the axle, and force measuring cells positioned between the upper ends of the links and the upper ends of the branches of the Y-shaped arm.

For a better understanding of the invention, reference should be had to the accompanying drawings wherein:

FIG. 4 is an enlarged fragmentary view of the load cell portion of FIG. 1 with parts broken away to better illustrate the construction; and FIG. 5 is an enlarged fragmentary view of a portion of FIG. 4 showing the means for transmitting the force to the load cell.

Figure 1:
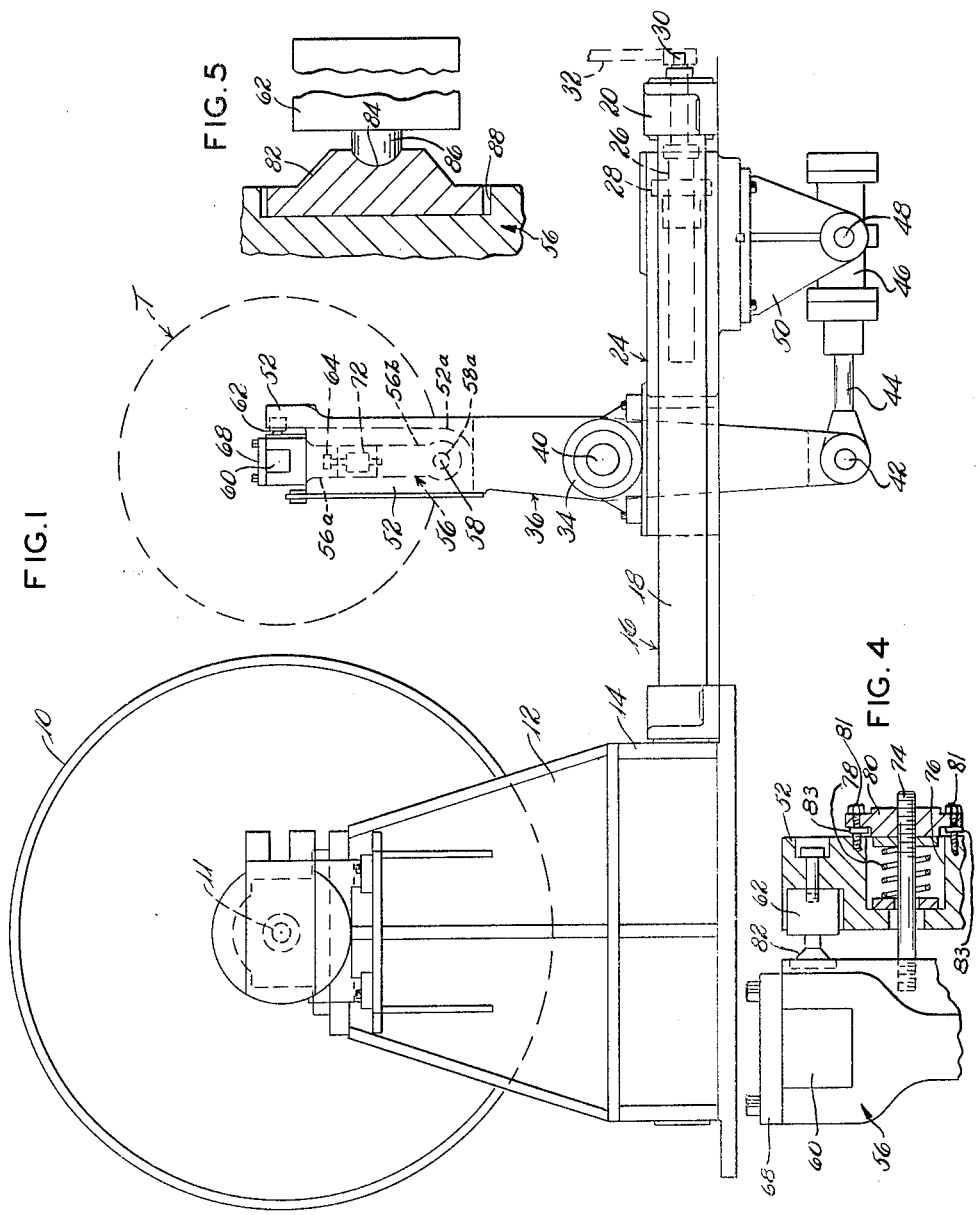
FIG. 1 is a side elevation of apparatus incorporating the principles of the invention.
Figure 2:
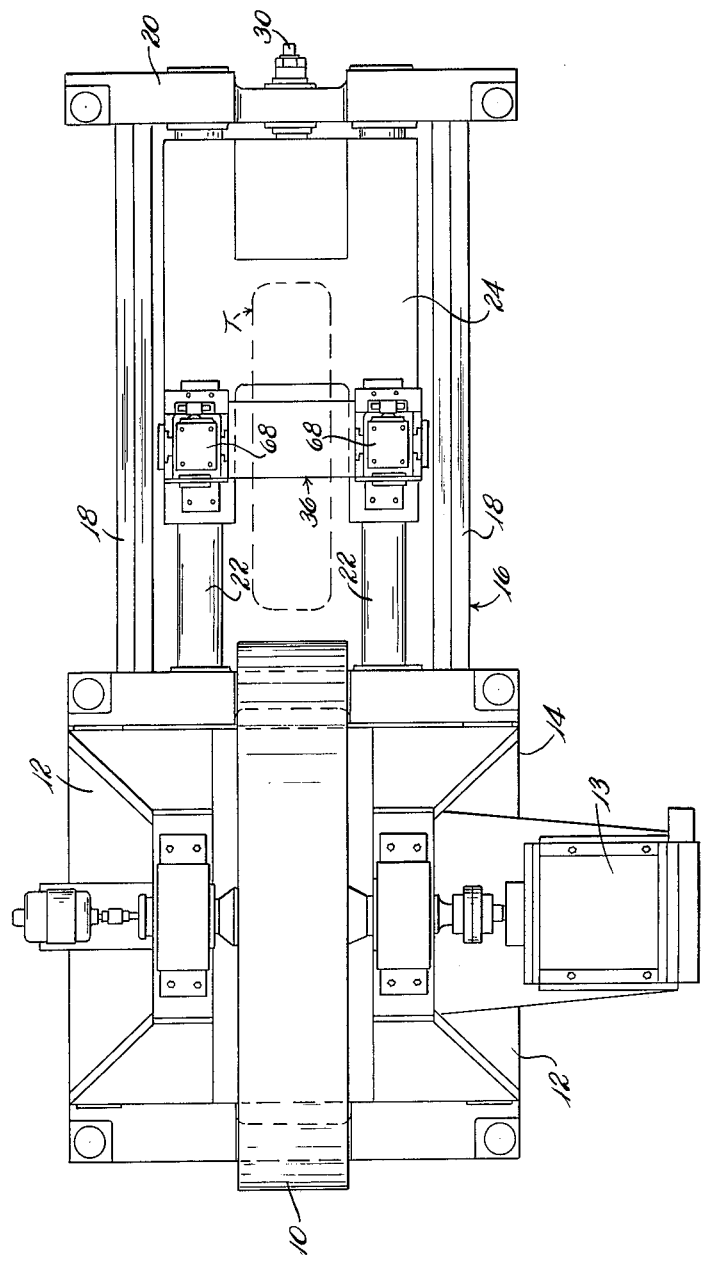
FIG. 2 is a plan view of the apparatus of FIG. 1.

In the drawings, the numeral 10 indicates a relatively large and heavy flywheel, typically of a diameter of 67.226 inches which is 1/300 of a mile per revolution of the flywheel. The flywheel 1 is rotatably mounted about a horizontal axis 11 by means of brackets 12 and is adapted to be rotated at a selected speed by adjustable driving means 13.

The brackets 12 are mounted upon a base 14 and extending laterally therefrom is a bed indicated as a whole by the numeral 16 which includes a pair of rectangular beams 18 joined together at their outer ends by a header 20. Carried between the header 20 and the base 14 are a pair of tubes 22 which slidably support a carriage 24 for movement towards and from the base 14. The position of the carriage 24 on the bed 16 is normally controlled by means of a screw 26 rotatably supported in the header 20 and threaded through a nut 28 secured to the carriage 24. Thus, when the squared end 30 of the screw 26 is rotated by means of a detachable wrench 32, the carriage 24 is moved towards and from the base 14 of the apparatus.

The carriage 24 is provided with a pair of bracket bearings 34 which pivotally support a Y-shaped arm indicated as a whole by the numeral 36. The bearings 34 receive trunnions 40 on the arm 36 and position the axis 38 of the arm 36 parallel with the axis 11 of the flywheel 10.

The lower end of the arm 36 is pivotally secured at 42 to a piston rod 44 of a hydraulic cylinder 46 pivotally mounted near its center on axis 48 by means of downwardly extending brackets 50 supported on the underside of the carriage 24.

The upper branches 52 and 54 of the Y-shaped arm 36 each pivotally supports a relatively short and light weight link indicated generally by numeral 56 about an axle 58a on lower ends 56b of the links 56. The axle 58 is on an axis 58a which is also parallel to the axis 11 of the flywheel 10. The upper ends 56a of the links 56 removably carry an axle 60 having square mounting ends to prevent rotation thereof. A tire T or other rotary member to be tested is rotatably mounted on the axle 60. Removable bearing caps 68 secure the axle 60 to the links 56. Positioned between the upper ends 56a of the links 56 and the upper branches 52 and 54 of the Y-shaped arm 36 are force measuring cells 62, capable of standing the maximum load applying the tire T against the flywheel 10, for example, 10,000 pounds maximum. The force measuring cells 62 are usually electrical in character and electric leads (not shown) are employed to bring the electrical change in condition of the cells to appropriately calibrated force measuring means (not shown).

Figure 3:
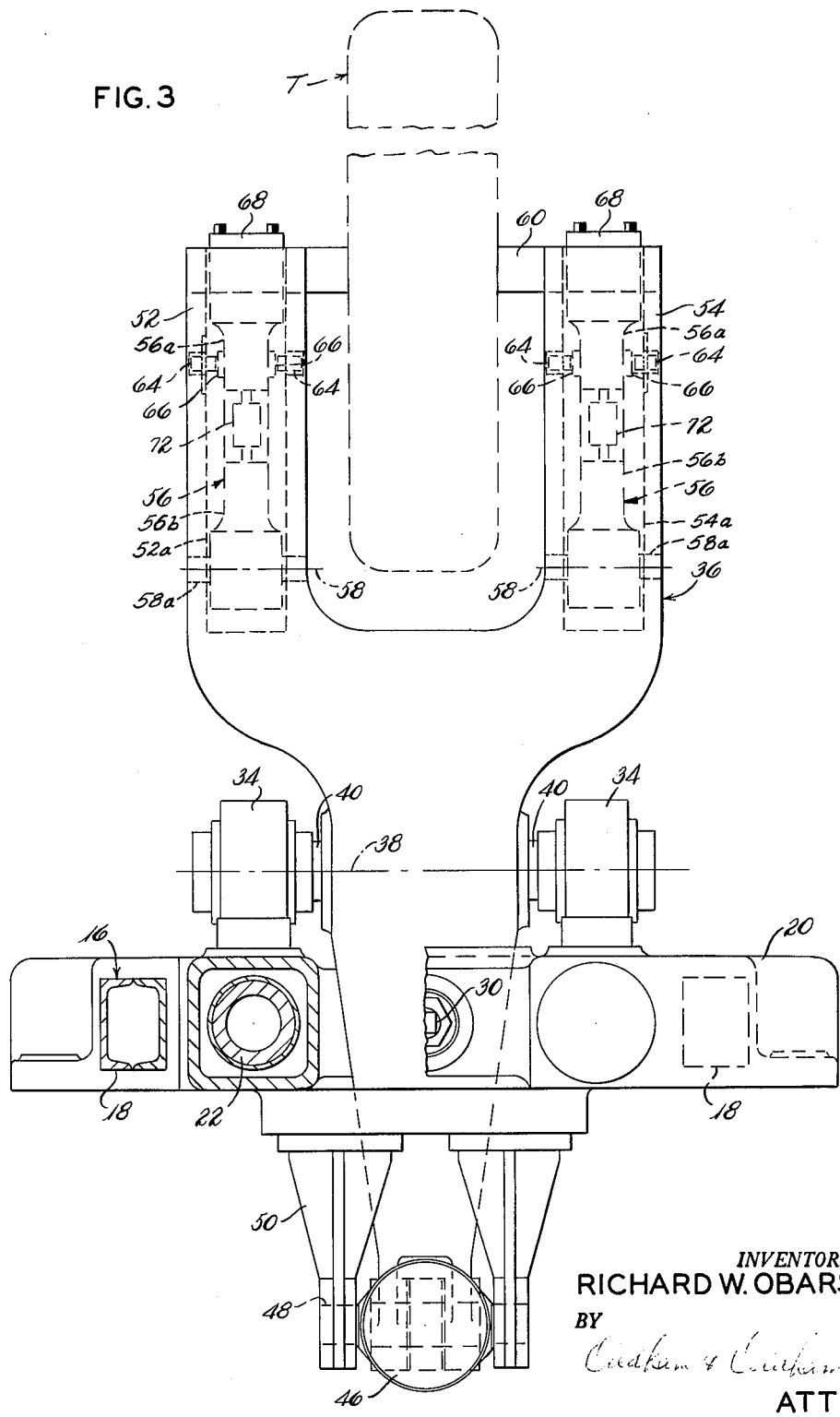
FIG. 3 is an end elevation of the apparatus of FIGS. 1 and 2.

To assist in maintaining the movement of the links 56 toward and from the pressure cells 62 in a substantially frictionless manner and to support the links 56 against any movement which would tend to bind the links 56 on the free pivotal movement about their axes 58, the upper ends of the branches 54 and 52 of the Y-shaped arm 36 are hollowed out on the side toward the flywheel 10 as indicated by the dotted line 52a on branch 52 in FIGURE 1 and FIGURE 3 and by the dotted line 54a on branch 54 in FIGURE 3. A pair of rollers 64 are rotatably mounted to the inner side walls of the branches 52 and 54 on either side of the links 56. These rollers 64 being normally spaced from wear plates 66 carried on the sides of the links 56. The clearance between the rollers 64 and wear plates 66 is small so that should transient side loading conditions develop causing the links 56 to deflect at 90° to the applied tire load the rollers 64 engage wear plates 66 and prevent further deflection.

Referring to FIG. 5, in the preferred practice of the invention the force measuring cells 62 are preloaded, usually some 10–15 percent, so as to take up any lost motion in the mechanism. This is accomplished by securing a rod 74 in each link 56 which rod extends freely through a bore 76 in the upper branches 52 and 54 of the Y-shaped arm 36. A compression spring 78 surrounds the rod 74 and engages between the branch 52 and a nut 80 threaded on the rod. Adjustment of the nuts 80 thereby gives a preloading to the force measuring cells 62 and takes all lost motion out of the load measuring system. This preloading can be compensated for in the actual load indicating instruments, as will be well understood. The preloading does not interfere with the application of load forces against the force measuring cells 62.

In addition, the preloading means function to take hammering and vibration out of the force transmitting system such as will sometimes occur during test, for example, if the flywheel is cleated. The preloading means can also be utilized to take the force measuring cells entirely out of the system all without physically removing the cells. When this is done, cap screws 81 are extended through holes in a flange on nut 80, each screw carrying a spacer washer 83. Then tightening down the screws 81 forces the washers 83 against the branch 52 and 54 thereby making each link 56 integral through stud 74 with its associated branch 52, 54 of the Y-shaped arm 36. This taking of the force measuring cells 62 out of the system is sometimes desirable when the flywheel is provided with very heavy cleats or with posts or plugs which engage, for example, a tire. Loading forces can then be measured, less accurately, by the pressure applied to the cylinder 46.

Turning now to FIG. 5, means are provided to prevent misalignment of the load forces, and these means comprise a button 82 having a socket-like opening 84 engaging with and partially encapsulating the rounded end of the pin or column 86 extending from the force measuring cell 62. The button 82 is received in a recess 88 in the side of the link 56, there being appropriate clearance between the sides of the button and the recess to provide automatic alignment of parts by way of the floating seat action even in the event of dimensional changes in any parts.

It will be recognized that the structure described positions the load measuring cells 62 ahead of substantially all points of friction in the apparatus, and with the loading force holding the tire against the flywheel being directly taken by the load cells. The inertia and friction of the links 56 is a minimum. The load cells can be used only to indicate the load, or can be used to hold the load to a selected amount, as will be understood.

In the operation of the apparatus described, the tire T to be tested is rotatably mounted upon the axle 60, and the axle 60 is positioned in the upper ends of the links 56, being secured therein by removable bearing caps 68. Now the carriage 24 is moved towards the base 14 so as to position the tire T very near to the surface of the flywheel 10. In a typical test, simulating the loading of a tire, the flywheel is brought up to the desired speed after the hydraulic cylinder 46 is operated to swing the Y-shaped arm 36 to apply the tire T against the surface of the flywheel with the desired approximate load. The exact load of the tire T against the flywheel 10 is determined during the entire run of the test by the reading on the pressure cells 62. During the period of the test, the Y-shaped arm 36 should be in a substantially vertical position so that gravitational forces are substantially eliminated on the load measuring system. Additionally, keeping the arm 36 vertical insures that the plane passing through the axis 11 and the centerline of load cells 62 also contains the point of tangency between the flywheel 10 and the tire T and contains the axis of axle 60. The position of the carriage 24, as effected by the rotation of the screw 26 is selected so that the Y-shaped arm 36 is in the position recited during tests.

It will be understood that various other tests on a rotary member can be performed in addition to the one specifically mentioned which simulates the loading of a tire upon a roadway. It will be evident that the loading of the tire against the flywheel can be gradually increased or gradually decreased during a test. It is also possible to measure vertical loadings upon a tire during a test by building a pressure cell 72 into each link 56 where one side of each cell 72 is connected to upper ends 56a of the links 56 and the other side is connected to the lower ends 56b of the links 56. In this instance the ends 56a and 56b will be connected only by the cell 72 so that all vertical movement therebetween will be transferred to the cell 72 to indicate vertical loading. It is to be noted that the axis 11 of the flywheel 10 and the axis of rotation of the tire T are parallel to each other and horizontally in alignment.

While in accord with the patent statutes, one best known embodiment of the invention has been illustrated and described in detail, it is to be particularly understood that the invention is not to be limited thereto or thereby, but that its scope is defined in the appended claims.

What is claimed is:

1. Apparatus for testing tires and the like and including a flywheel on a horizontal axis, means for rotating the flywheel, a bed extending horizontally in the plane of the flywheel, a carriage slidably mounted on the bed, hand operated screw means for adjustably moving the carriage toward and from the flywheel, a Y-shaped arm, means pivotally mounting the arm near the middle thereof and vertically extending on the carriage on an axis parallel to the axis of the flywheel, a hydraulic motor pivotally mounted on the underside of the carriage and pivotally connected to the lower end of the arm for effecting swinging movement of the top of the arm toward and from the flywheel, a link pivotally mounted on the upper end of each branch of the Y-shaped arm, each link being pivoted on an axle parallel to the axis of the flywheel, an axle carried by the upper ends of the links parallel to the axis of the flywheel adapted to rotatably carry the tire to be tested, force measuring cells positioned between the upper ends of the links and the upper ends of the branches of the Y-shaped arm, roller means carried by the upper ends of the branches of the Y-shaped arm for supporting the links in the event of transient side loading in the movement thereof about their pivotal axes, and means for controllably preloading the force measuring cells.

2. Apparatus for testing tires and the like and including a flywheel, means for rotating the flywheel, a bed extending in the plane of the flywheel, a carriage slidably mounted on the bed, means for adjustably moving the carriage toward and from the flywheel, a Y-shaped arm, means pivotally mounting the arm near the middle thereof and vertically extending on the carriage on an axis parallel to the axis of the flywheel, a hydraulic motor pivotally mounted on the underside of the carriage and pivotally connected to the lower end of the arm for effecting swinging movement of the top of the arm toward and from the flywheel, a link pivotally mounted on the upper end of each branch of the Y-shaped arm, each link being pivoted on an axis parallel to the axis of the flywheel, an axle carried by the upper ends of the links parallel to the axis of the flywheel adapted to rotatably carry the tire to be tested, force measuring cells positioned between the upper ends of the links and the upper ends of the branches of the Y-shaped arm providing a positive stop for the links in the movement thereof about their pivotal axes, and floating seat means for effecting alignment between each force measuring cell and each link.

3. Apparatus for testing tires and the like and including a flywheel, means for rotating the flywheel, a bed extending in the plane of the flywheel, a carriage slidably mounted on the bed, means for adjustably moving the carriage toward and from the flywheel, a Y-shaped arm, means pivotally mounting the arm on the carriage on an axis parallel to the axis of the flywheel, means pivotally mounted on the carriage and pivotally connected to the arm for effecting swinging movement of the arm toward and from the flywheel, a link pivotally mounted on the upper end of each branch of the Y-shaped arm, each link being pivoted on an axis parallel to the axis of the flywheel, an axle carried by the upper ends of the links parallel to the axis of the flywheel adapted to rotatably carry the tire to be tested, force measuring cells positioned between the upper ends of the links and the upper ends of the branches of the Y-shaped arm, roller means carried by the upper ends of the branches of the Y-shaped arm for supporting the links in the event of transient side loads in the movement thereof about their pivotal axes, and means for locking each link with each branch of the Y-shaped arm to cut each force measuring cell out of operation.

4. Apparatus for testing tires and the like and including a flywheel, means for rotating the flywheel, a bed extending in the plane of the flywheel, a carriage slidably mounted on the bed, means for adjustably moving the carriage toward and from the flywheel, a Y-shaped arm, means pivotally mounting the arm on the carriage on an axis parallel to the axis of the flywheel, means pivotally mounted on the carriage and pivotally connected to the arm for effecting swinging movement of the arm toward and from the flywheel, a link pivotally mounted on the upper end of each branch of the Y-shaped arm, each link being pivoted on an axis parallel to the axis of the flywheel adapted to rotatably carry the tire to be tested, and force measuring cells positioned between the upper ends of the links and the upper ends of the branches of the Y-shaped arm.

5. Apparatus for testing tires and the like and including a rotary flywheel, means mounting the tire to be tested for movement to and from the flywheel means for moving the mounting means to apply the tire to be tested against the flywheel with a selected loading, and pressure cell means carried by the mounting means and taking the load applying the tire to be tested against the flywheel for indicating the loading on the tire to be tested, said pressure cell means measuring the load in two different directions, the directions being substantially at right angles to each other.

6. Apparatus for testing tires and the like and including a rotary flywheel, means mounting the tire to be tested for movement to and from the flywheel, means for moving the mounting means to apply the tire to be tested against the flywheel with a selected loading, said mounting means including a pair of relatively short and light weight links rotatably supporting the tire to be tested, force measuring cells limiting the movement of the links, and means resiliently and adjustably holding the links against the cells to preload the cells.

7. Apparatus for testing tires and the like and including a rotary flywheel, means mounting the tire to be tested for movement to and from the flywheel, and means for moving the mounting means to apply the tire to be tested against the flywheel with a selected loading, said mounting means including a pair of relatively short and light weight links rotatably supporting the tire to be tested, force measuring cells limiting the movement of the links.

References Cited by the Examiner
UNITED STATES PATENTS

| | | | |
|---|---|---|---|
| 1,068,180 | 7/13 | Sonntag | 73—8 |
| 1,588,343 | 6/26 | Stevens | 73—8 |
| 2,367,838 | 1/45 | Allen | 73—7 |
| 2,722,587 | 11/55 | Buzzetti et al. | 73—88.5 X |
| 2,869,361 | 1/59 | Powell et al. | 73—146 |

RICHARD C. QUEISSER, *Primary Examiner.*

JOSEPH P. STRIZAK, *Examiner.*